United States Patent [19]

Itagaki et al.

[11] Patent Number: 4,758,750
[45] Date of Patent: Jul. 19, 1988

[54] LINEAR MOTOR OF MOVING-COIL TYPE

[75] Inventors: Masato Itagaki; Susumu Nakayama, both of Shimizu; Katsuaki Kikuchi, Tsuchiura; Yosio Haeda, Yaizu; Teruo Umehara, Hanyu; Fumihiko Kitani, Shimizu, all of Japan

[73] Assignee: Hitachi, Ltd., Tokyo, Japan

[21] Appl. No.: 13,881

[22] Filed: Feb. 12, 1987

[30] Foreign Application Priority Data

Feb. 19, 1986 [JP] Japan ............................ 61-32981
Mar. 19, 1986 [JP] Japan ............................ 61-59170

[51] Int. Cl.⁴ .......................................... H02K 41/00
[52] U.S. Cl. .................................... 310/13; 310/27
[58] Field of Search ..................... 310/12, 13, 27; 318/135

[56] References Cited

U.S. PATENT DOCUMENTS 4,314,295 2/1982 Frandsen ........................ 310/134
4,318,038 3/1982 Munehiro ........................ 318/135
4,396,966 8/1983 Scranton et al. ................ 310/13

Primary Examiner—R. Skudy
Attorney, Agent, or Firm—Antonelli, Terry & Wands

[57] ABSTRACT

A linear motor of moving-coil type is disclosed, in which a multi-phase moving coil includes a plurality of flat coil units each not wider than the longitudinal length of a permanent magnet making up a stationary part divided by the number of coil phases, the flat coil units being arranged successively in the same plane with central parts not adjacently overlaid one on the other. The central parts of the moving flat coil units have a thickness equivalent to a single phase in spite of the multiple phases of the moving coil. Thus a great electromagnetic force is generated, and at the same time a high propulsive force is obtained with the magnetic flux density not reduced in the gap accomodating one phase of coils alone.

9 Claims, 6 Drawing Sheets

FIG. 8
FIG. 9
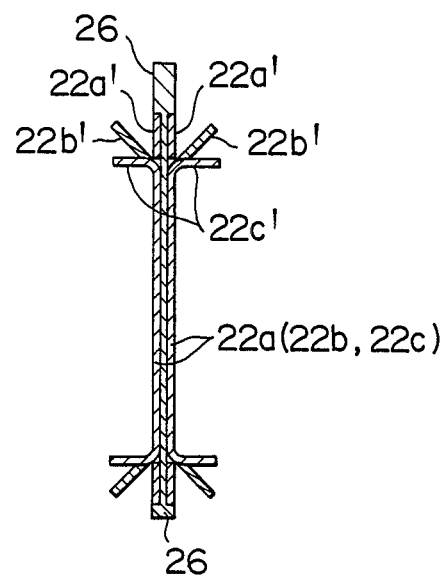
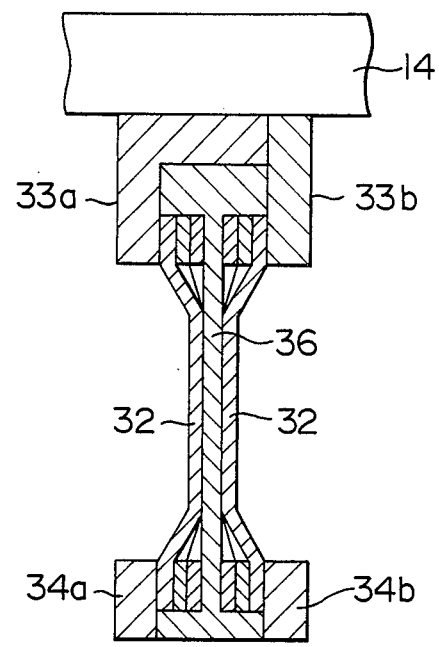

LINEAR MOTOR OF MOVING-COIL TYPE

BACKGROUND OF THE INVENTION

The present invention relates to a linear motor of moving-coil type comprising a stationary part including two opposed magnet paths each having a plurality of permanent magnets arranged linearly, and a moving coil arranged in the gap formed between the two magnet paths and adapted to move linearly along the magnet paths.

A linear motor of moving-coil type for a magnetic disk is disclosed in the U.S. Pat. No. 4,396,966 as a conventional drive system for positioning the linear motor along a long stroke. Such a linear motor of moving-coil type comprises a plurality of adjacent magnets arranged longitudinally with alternate magnet poles forming alternately-changing magnetic fields in the space thereabove, and a plurality of coil units wound in a direction perpendicular to the magnetic fluxes of the magnetic field in the space and combined to make up a carriage.

In order for the above-mentioned linear motor of the moving-coil type to move continuously along a long stroke, at least two coil units are necessary, and if a higher propulsive force is to be obtained, an increased number of coil units is required.

The simplest construction of the above-mentioned system would be obtained by arranging flat coil units described in the prior art mentioned above in longitudinal direction as long as possible. Nevertheless, it is impossible to arrange the flat coil units longer than the total length of the magnets less the carriage stroke. Another type of system may comprise flat coil units can be arranged in staggered layers. In view of the fact that the electromagnetic force of the magnets acting on the coil units decreases in proportion to the square of the distance, however, this type of system involves a low motor efficiency. Specifically, the coil units of second and third layers have an electromagnetic force extremely reduced as compared with those nearest to the magnets and therefore the propulsive force of the whole carriage fails to increase in spite of the increased number of coil units.

In any of the systems mentioned above, it is a difficult problem how to obtain a high propulsive force.

SUMMARY OF THE INVENTION

The object of the present invention is to provide a linear motor of multi-pole multi-phase moving-coil type high in efficiency.

In order to achieve this object, there is provided in the present invention a linear motor of moving-coil type comprising a plurality of flat coil units each having a width less than the longitudinal length of a permanent magnet divided by the number of coil phases, which coil units are arranged in a plane with the central parts thereof staggered alternately, each of the central parts as thick as one phase.

The moving coil configured as above, in spite of being a multi-phase one, has the central part thereof as thick as one phase and located in a gap of a couple of magnet bands. Specifically, the moving coil units arranged in the gap are multi-phase coils, and therefore a large electromagnetic force is generated on the one hand, and the fact that the gap length of the magnetic circuit is equivalent to not more than one phase prevents the magnetic flux density from being decreased thereby to increase the electromagnetic force generated in the coil thus generating a high propulsive force on the other hand.

BRIEF DESCRIPTION OF THE DRAWINGS

FIG. 8 is a sectional view taken along the line VIII—VIII in FIG. 7.

FIGS. 9 and 10 are sectional views taken at the same position as the line C—C in FIG. 3 showing different embodiments of the flat moving coil respectively.

DESCRIPTION OF THE PREFERRED EMBODIMENTS

Figure 1:
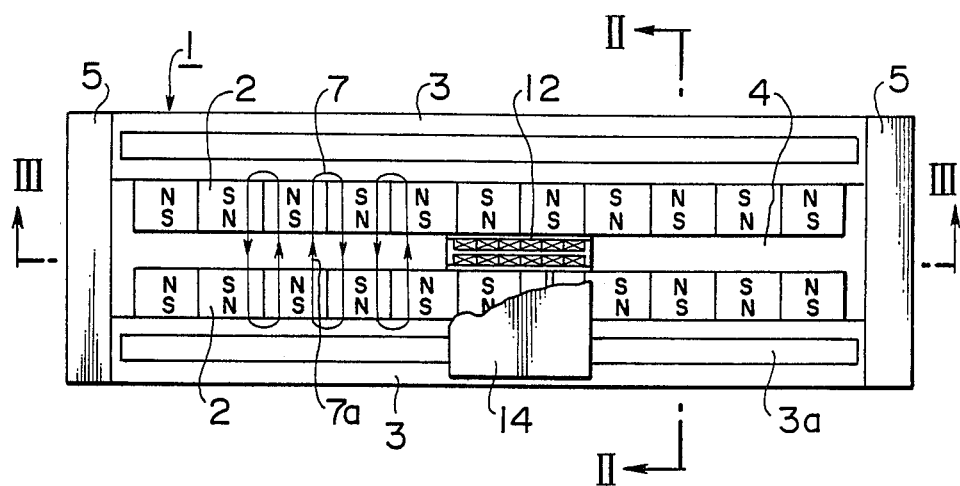
FIG. 1 is a plan view showing a configuration of a linear motor according to an embodiment of the present invention.

An embodiment of the present invention will be explained with reference to the accompanying drawings. In FIG. 1, a stationary part including a plurality of permanent magnets arranged along the longitudinal direction forming a running path is constructed in the manner mentioned below. A plurality of permanent magnets 2 in the form of rectangular parallelepiped are aligned closely to each other with the magnetic poles thereof reversed alternately and are securely fixed on a side yoke 3 thereby to form a magnet band path. In similar manner, the other magnet band path is formed with magnets 2 securely fixed to a side yoke 3 with the magnetic poles thereof reversed alternately. The two magnet band paths are assembled on end yokes 5 and a plate 6 in such a manner as to form a gap 4 between the opposed magnet groups thereby to form an integral stationary part 1. The magnetic poles of the magnets 2, as shown in FIG. 1, are arranged in alternately opposite ways and in opposed relations between the opposite groups for generating magnetic fluxes 7. As a result, the gap 4 has therein magnetic fluxes 7a perpendicular to the length of the stationary part.

Figure 2:
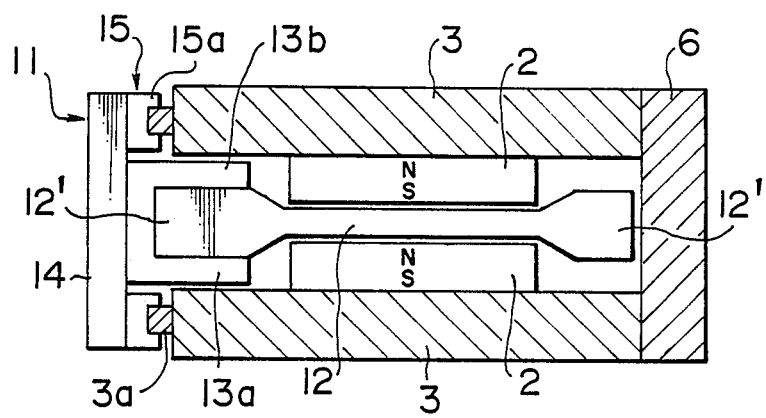
FIG. 2 is a sectional view taken along the line II—II in FIG. 1.

A moving part, on the other hand, as shown in the sectional view of FIG. 2 taken along the line II—II in FIG. 1, includes a moving coil 12, coil fixing jigs 13a, 13b, a table 14 and slides 15a of linear guides 15. The moving coil 12 is wound in a direction perpendicular to the magnetic fluxes 7a in a longitudinal plane in such a form as shown in FIG. 2 to the thickness equivalent to one phase at the part thereof opposed to the magnets, while the upper and lower ends 12' thereof are thicker than the central part thereof. The moving coil 12, which is fixed on the table 14 by the coil-fixing jigs 13a, 13b, is adapted to move linearly along tracks 3a of the linear guides 15 fixed on the stationary part.

Figure 3:
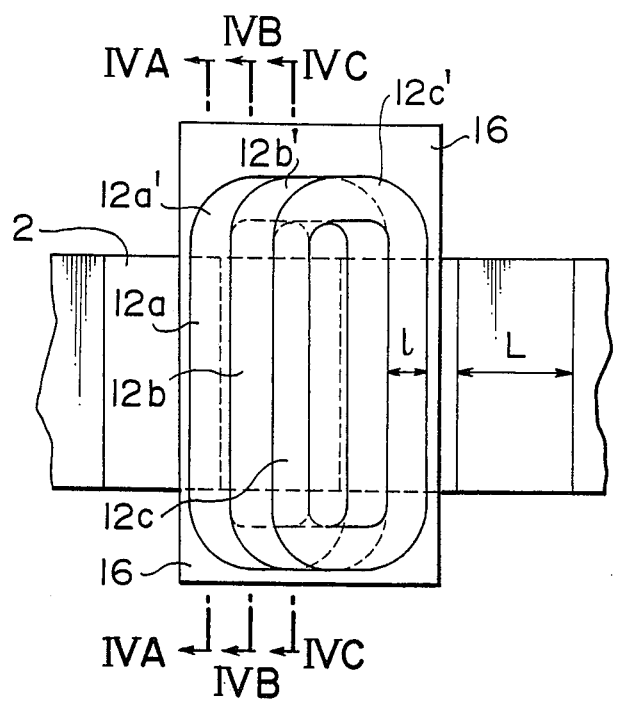
FIG. 3 is a sectional view taken along the line III—III in FIG. 1.
Figure 4A:
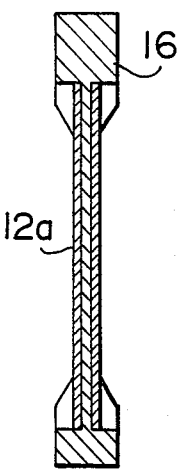
FIGS. 4A, 4B and 4C are sectional views of the flat laminated coil shown in FIG. 3 along the lines A—A, B—B and C—C respectively.
Figure 4B:
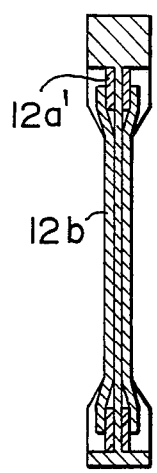
Figure 4C:
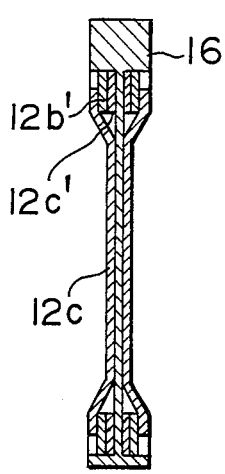

The construction of the moving coil 12 will be explained more in detail with reference to FIGS. 3, 4 and 5. An enlarged sectional view of a three-phase coil taken along the line III—III in FIG. 1 is shown in FIG. 3. The moving coil 12 includes three flat coil units 12a, 12b, 12c wound within the width 1 one third the width L of the permanent magnet 2 in a plane parallel to the page. The flat coil units 12b, 12c are displaced from the flat coil unit 12a by 1 and 2 1 respectively, and therefore the central parts of the coil units are not laid one on another, so that the central part of the moving coil 12 remains in a thickness equivalent to one phase. The upper and lower ends 12'a, 12'b and 12'c not in opposed relations with the magnets have such an ample space around them that they may be formed in various shapes. The sectional views of the coil units along the lines A—A, B—B and C—C in FIG. 3 are shown respectively in FIGS. 4A, 4B and 4C. The upper and lower ends shown in FIGS. 4A, 4B and 4C have a thickness equivalent to one phase, two phases and three phases respectively. The flat coil units 12a, 12b and 12c are fit in the side recesses of an insulating member 16 or bonded fixedly to the sides of a flat insulating member, thus forming an integral unit.

Figure 5:
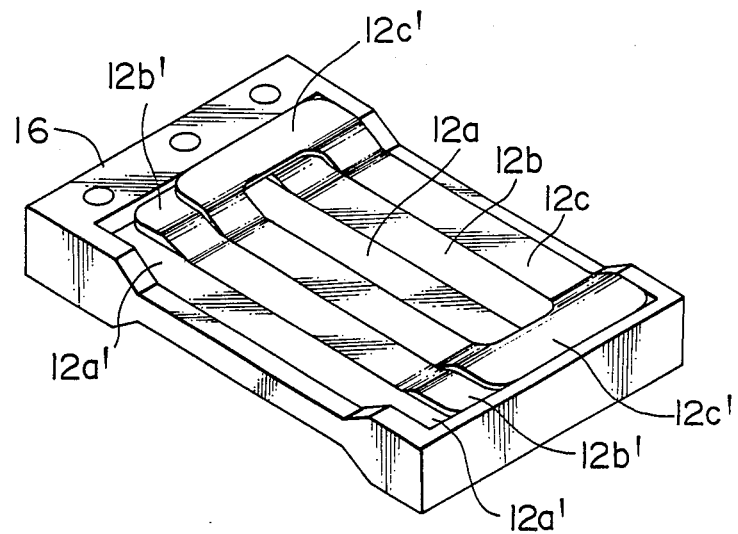
FIG. 5 is a perspective view of a flat moving coil.

The moving coil 12, as illustrated in FIG. 5 showing a perspective view of a general configuration, has the central part thereof as thick as a single phase and positioned in the magnetic fluxes 7 of FIG. 1. The upper and lower ends 12'a, 12'b and 12'c are so relatively positioned that the end 12'b is laid over the upper surface of the end 12'a and the end 12'c over the surface of the end 12'b.

Figure 6A:
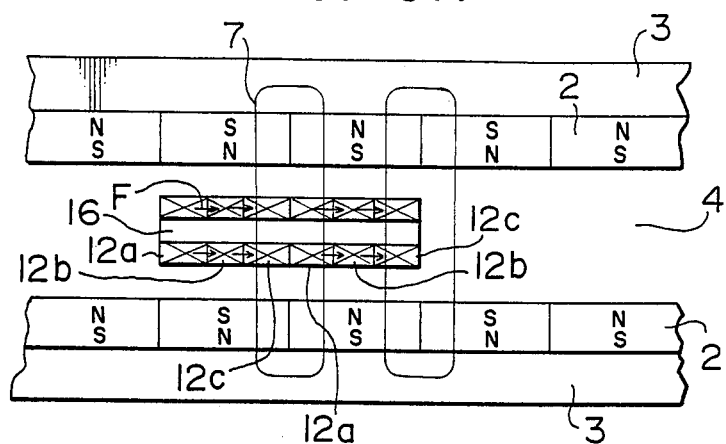
FIGS. 6A, 6B and 6C are diagrams for explaining the operation of a linear motor.
Figure 6B:
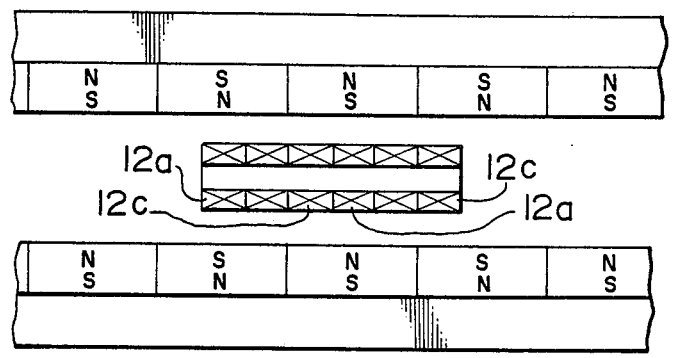
Figure 6C:
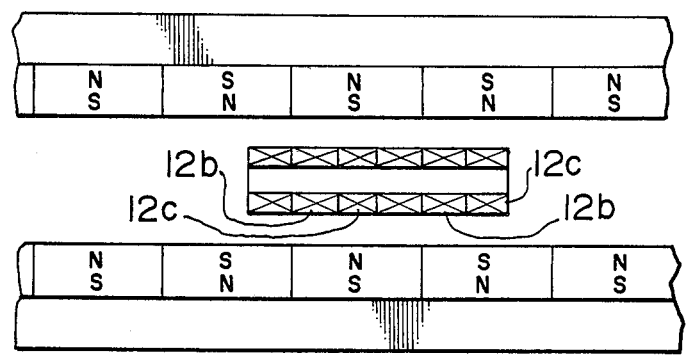

Now, explanation will be made of the manner in which a linear motor of moving-coil type is driven. FIG. 6 is a partly-enlarged view of FIG. 1. In FIG. 6A, upon energization of coil units 12a, 12b of an insulating member 16 located in a gap 4 between yokes 3, an electromagnetic force F is generated thereby to move the insulating member 16 in the manner shown in FIG. 6B. Upon energization of coil units 12a, 12c at the next moment, the insulating member 16 makes a further movement as shown in FIG. 6c. Upon further energization of the coil units 12b, 12c under this condition, the insulating member 16 moves to the position shown in FIG. 6A. If the energization of the coil of the insulating member 16 is switched continuously in accordance with the changes in magnetic pole by a magnetic field sensor, the insulating member 16 is moved at high speed within the gap 4.

Figure 7:
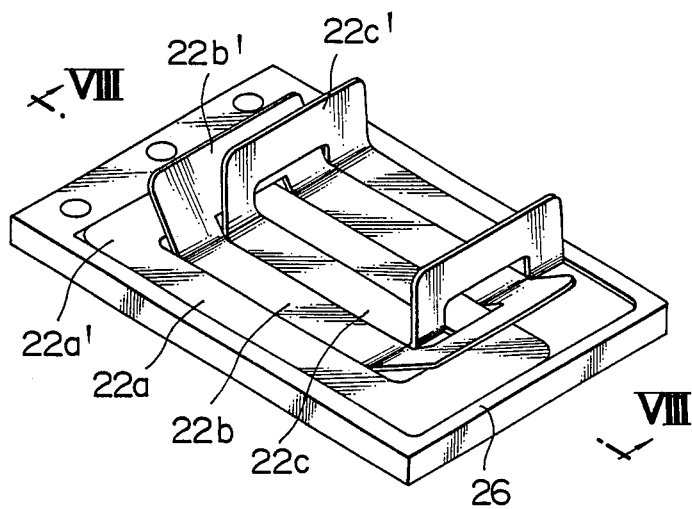
FIG. 7 is a perspective view of a flat moving coil according to another embodiment of the present invention.

Another embodiment of the coil having a construction as shown in FIG. 7 is available. The moving coil 22 includes three-phase flat coil units 22a, 22b, 22c and an insulating member 26 which are bonded fixedly to each other in integral manner. The central parts of the flat coil units 22a, 22b, 22c are displaced from each other and have a thickness equivalent to one phase in the same manner as in FIG. 5. The upper and lower coil ends 22'a, 22'b, 22'c, on the other hand, are bent by 45° and 90° respectively for two phases, which angles may not be very strict. The manner in which the upper and lower ends of the coils are bent is shown in FIG. 8 from the sectional view taken along the line VIII—VIII of FIG. 7. This indicates a surface area larger than that of the coils in FIG. 5.

According to this embodiment involving a larger surface area, heat is discharged more effectively while the moving coil is stationary as well as when it is driven, thus reducing such troubles as thermal deformation which otherwise might be caused by the heat generated from the coil.

A linear motor of multi-pole multi-phase moving-coil type comprising a stationary part 1 and a moving part 11 combined described with reference to the foregoing embodiment has an advantage described below. Since the coil has multiple phases, all the coil units other than a phase of the coil located in the joints of the magnets can be energized. Also, in view of the fact that the coil thickness is equivalent to one phase in spite of multiple phases, the gap width remains small and therefore the magnetic flux density is not decreased. As a result, the electromagnetic force of the flat coil units is increased for an improved efficiency.

Another embodiment of the moving coil is shown in FIG. 9. An insulating member 36 and coils 32 in this embodiment have a construction similar to that in FIG. 4. The sectional views of FIG. 9, and also FIG. 10 which will be described later, correspond to FIG. 3 taken along the line C—C. This embodiment of FIG. 9 is different from that of FIG. 2 in that in this embodiment, the coil 32 on the insulating member 36 is fixed on a table 14 through radiation plates 33a, 33b on one side thereof, and mounted with radiation plates 34a, 34b on the other side thereof. These radiation plates are made of a material of a high radiating efficiency such as aluminum.

The moving coil generates heat upon energization thereof. This heat is transmitted from the radiation plates 33a, 33b, 34a, 34b to the table 14, while at the same time being discharged into the atmosphere by radiation. The temperature increase of the moving coil is therefore prevented, thereby making it possible to apply a large current, with the result that a large propulsive force of the motor is obtained for an improved performance of the linear motor. Also, the insulating shield of the coil is prevented from deterioration.

Figure 10:
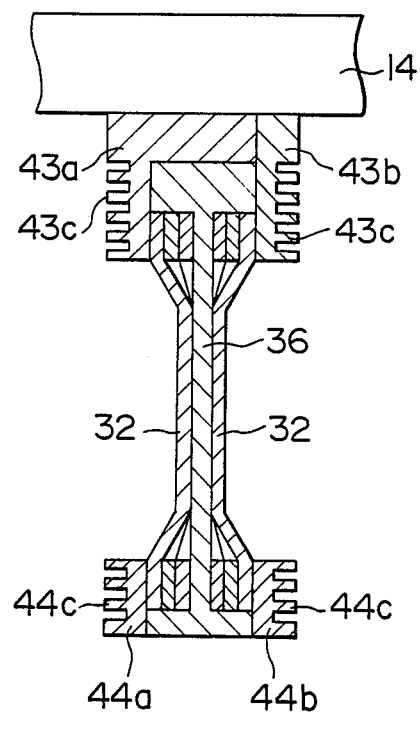

A further embodiment of the moving coil is shown in FIG. 10. This embodiment is different from that of FIG. 9 in that in this embodiment, each of the outer peripheral parts of the radiation plates 43a, 43b, 44a, 44b is provided with a multiplicity of fins 43c and 44c respectively. In this embodiment, the fins function to enlarge the radiation area of the radiation plates and thereby further improve the radiation effect.

Figure 11:
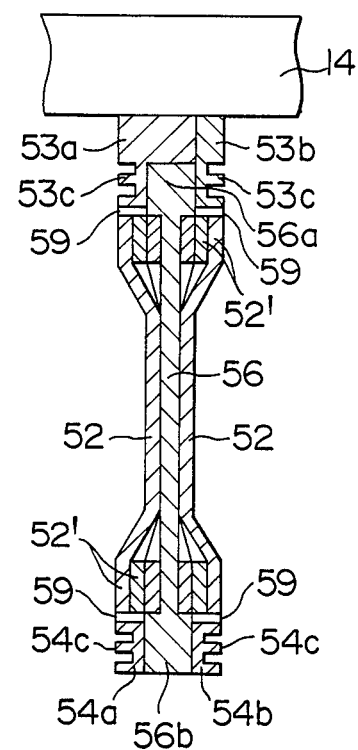
FIG. 11 is a sectional view of a flat moving coil according to still another embodiment.

Still another embodiment of the moving coil is shown in FIG. 11. The upper and lower ends 56a, 56b of the insulating member 56 are formed smaller in width than those of the aforementioned embodiments. Also, the radiation plates 53a, 53b with the fin 53c, the radiation plates 54a, 54b with the fin 54c, and the coil 52 are bonded to each other with a resin (thermo-setting resin) 59 of high heat conductivity.

The upper and lower ends 52' of the coil 52 are uneven as shown in FIG. 11. In this embodiment, however, the outer peripheral parts of the upper and lower ends 52' are filled closely with the resin 59, and therefore heat is efficiently transmitted from the coil 52 to the radiation plates 53, 54 thereby to improve the cooling function.

We claim:

1. A linear motor of moving-coil type comprising:
a stationary part including a pair of magnet bands extending in a longitudinal direction disposed in parallel relationship, each band having a plurality of permanent magnets having a width dimension as measured in said longitudinal direction with the magnetic poles thereof alternately reversed, said magnet bands being placed in opposed relations with each other with the magnetic poles thereof arranged in opposite polarities to each other, said magnet bands having a uniform gap therebetween; and a moving part including a multi-phase moving coil having a plurality of flat coil units arranged in said gap, the dimension of a central part of the coil unit in the longitudinal direction of the magnetic band of the multi-phase moving coil being not greater than the width of one of said permanent magnets divided by the number of coil phases in said multi-phase moving coil, there being provided a plurality of the flat coil units each with central parts having the same width, said flat coil units being arranged successively in such a manner than the central parts thereof lie along a common central plane and are not laid one on the other in said gap, the flat coil units having a total dimension as measured in said longitudinal direction equivalent to an appropriate number of blocks each including two magnets, said flat coil units being arranged for movement in the gap in the longitudinal direction of the magnetic band thereby to make up a moving flat coil with adjacent coil units having a thickness equivalent to the thickness of a single phase coil unit, said moving flat coil being fixed on a table.

2. A linear motor of moving-coil type according to claim 1, wherein said moving flat coil units are arranged back-to-back with an insulating member therebetween, thereby forming two coil unit parts each corresponding to a single phase.

3. A linear motor of moving-coil type according to claim 1, wherein the total length of the moving flat coil units along the width thereof is equivalent to the length of two blocks.

4. A linear motor of moving-coil type according to claim 1, wherein the ends of the moving flat coil units of respective phases are laid one on the other.

5. A linear motor of moving-coil type according to claim 1, wherein the ends of the moving flat coil units of respective phases are placed one over the other in spaced relationship with each other.

6. A linear motor of moving-coil type according to claim 1, wherein a fixing member for fixing the moving flat coil units on a moving table is made of a heat radiating material.

7. A linear motor of moving-coil type according to claim 6, wherein the outer peripheral part of the fixing member of the heat radiating material is formed with a multiplicity of fins.

8. A linear motor of moving-coil type according to claim 6, wherein the ends of the moving flat coil units are filled with a heat-conductive resin and the fixing member of the heat radiating material is bonded.

9. A linear motor of moving-coil type comprising:

a stationary part including a pair of side yokes, a plurality of permanent magnets arranged in longitudinal direction with adjacent magnets thereof in opposite polarities thereby to make up a stationary member of a magnet band, a pair of said stationary members being placed in opposed relations with each other with magnetic polarities alternately opposed to each other, said permanent magnet bands being arranged in a manner to form a longitudinal gap therebetween, the side yokes having the ends and the lower parts thereof fixed on end yokes and a plate, the side yokes having rails thereon; and a moving part including a multi-phase moving coil having a plurality of flat coil units arranged in said gap, each flat coil unit having a width not more than the size of each permanent magnet as measured in said longitudinal direction divided by the number of coil phases, said flat coil units being arranged in a plane successively in such a manner that the central parts thereof may not be laid one on the other, the flat coil units having a total dimension as measured in said longitudinal direction equivalent to an appropriate number of blocks each including two magnets, said flat coil units being arranged in the gap thereby to make up a moving flat coil with adjacent coil units having a thickness equivalent to the thickness of a single phase coil unit, said moving flat coil being fixed on a table through a fixing member, said moving part further including sliders on the sides of said table, said sliders being placed on said rails.

* * * * *